Nov. 23, 1948.  H. I. MORRIS  2,454,666
APPARATUS FOR VULCANIZING FLEXIBLE TUBES
Filed Sept. 21, 1945  4 Sheets-Sheet 1

INVENTOR.
HOWARD I. MORRIS.

Nov. 23, 1948.    H. I. MORRIS    2,454,666
APPARATUS FOR VULCANIZING FLEXIBLE TUBES
Filed Sept. 21, 1945    4 Sheets-Sheet 3
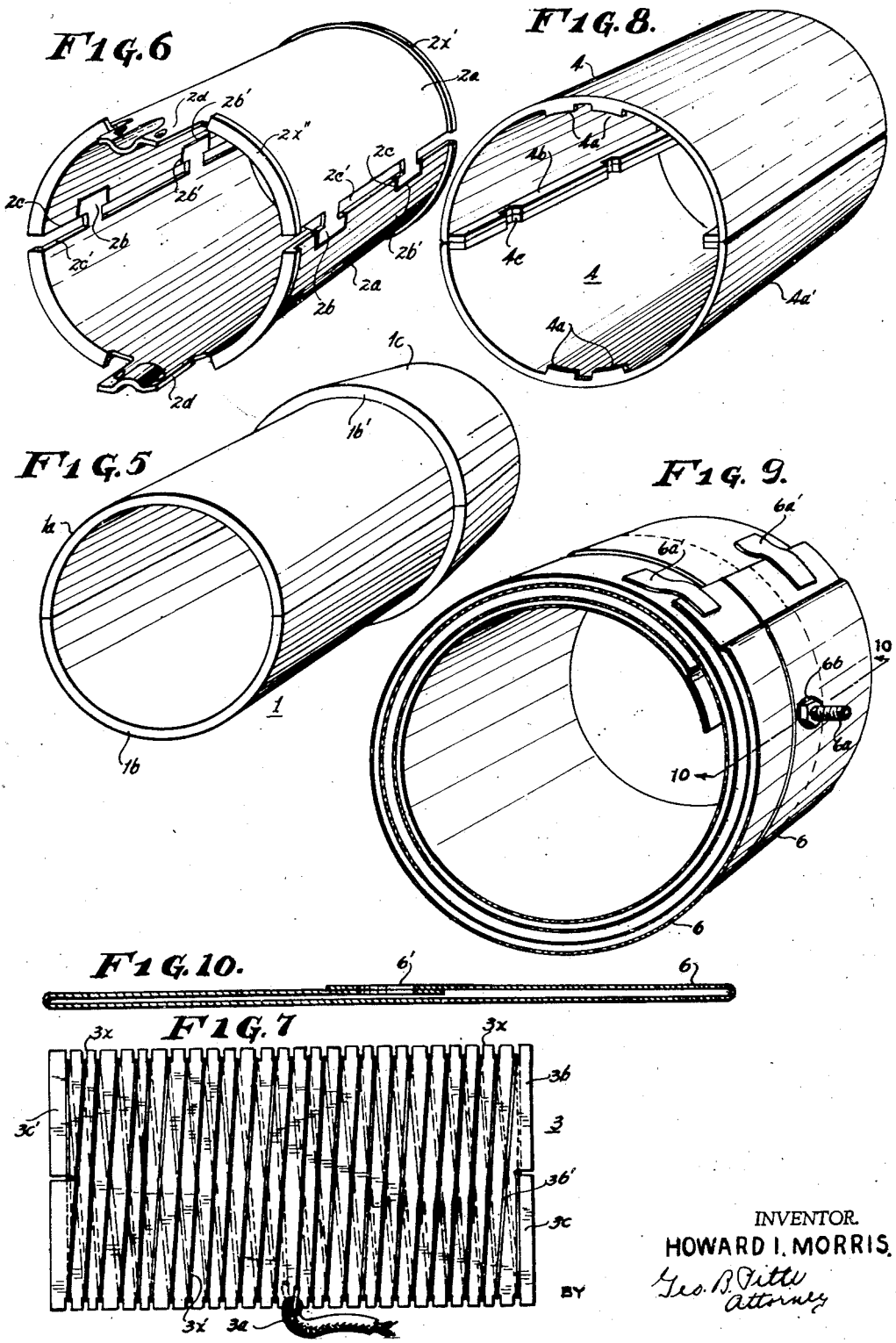
INVENTOR.
HOWARD I. MORRIS.
BY Nov. 23, 1948.                H. I. MORRIS                2,454,666
               APPARATUS FOR VULCANIZING FLEXIBLE TUBES
Filed Sept. 21, 1945                                 4 Sheets-Sheet 4

INVENTOR.
HOWARD I. MORRIS.
BY Geo. B. Pitts
    Attorney

Patented Nov. 23, 1948

2,454,666

UNITED STATES PATENT OFFICE 2,454,666

APPARATUS FOR VULCANIZING FLEXIBLE TUBES

Howard I. Morris, San Marcos, Calif., assignor to The Yoder Company, Cleveland, Ohio, a corporation of Ohio Application September 21, 1945, Serial No. 617,807

1 Claim. (Cl. 18—18)

This invention relates to apparatus for repairing rubber products by the application of heat thereto, more particularly products of this type of tubular shape in cross section, the product shown for illustrative purposes consisting of an inner tube for a pneumatic tire. However, it is not intended that the invention is to be limited to this kind of an article.

One object of the invention is to provide an improved vulcanizing apparatus the parts of which are capable of ready assembly in relation to the area of the product to be repaired and disassembly relative thereto.

Another object of the invention is to provide an improved apparatus of this character capable of assembly around a portion of an annular shaped article of manufacture for heat treating a portion thereof and disassembly therefrom.

Another object of the invention is to provide an improved vulcanizing apparatus for repairing a tubular article formed of elastic material, wherein the heat may be directly applied to the repair material and wall of the article.

Another object of the invention is to provide an improved apparatus of this type of relatively simple construction arranged to permit ready assembly and disassembly thereof.

Another object of the invention is to provide an improved vulcanizing apparatus, wherein during the vulcanizing operation, pressure is provided for and maintained on the parts thereof by an air bag formed of material other than rubber, whereby cost of operation is reduced and use of rubber is avoided.

Another object of the invention is to provide an improved vulcanizing apparatus capable of assembly around a flexible tube and employing an inflatatable member for exerting pressure, formed of inexpensive material, whereby replacement may be made at minimum expense.

Another object of the invention is to provide an improved vulcanizing apparatus capable of assembly around a flexible tube and employing an inflatable paper bag adapted to be wrapped around the assembly for exerting pressure thereon when inflated, the paper bag being replaceable at minimum expense, whereby the cost of up-keep of the apparatus is materially reduced.

Other objects of the invention will be apparent to those skilled in the art to which my invention relates from the following description taken in connection with the accompanying drawings, wherein Fig. 1 is a longitudinal section of an apparatus embodying my invention, on the line 1—1 of Fig. 2, shown in operative relation to an inner tube for a pneumatic tire ready for vulcanizing the repair material and adjacent wall of the tube.

Fig. 5 is a perspective view of the mandrel;

Fig. 6 is a perspective view of the inner shells for the heating member;

Fig. 7 is a plan view of a heating element;

Fig. 8 is a perspective view of the outer shells for the heated member;

Fig. 9 is a perspective view of the binding or pressure member when in final position around the tube, the sections forming the heating member and mandrel and ready to be inflated (the tube and these latter parts being omitted to simplify the illustration);

Fig. 10 is a fragmentary section of the outer end portion of the pressure member on the line 10—10 of Fig. 9 (the valve being omitted).

Figure 1:
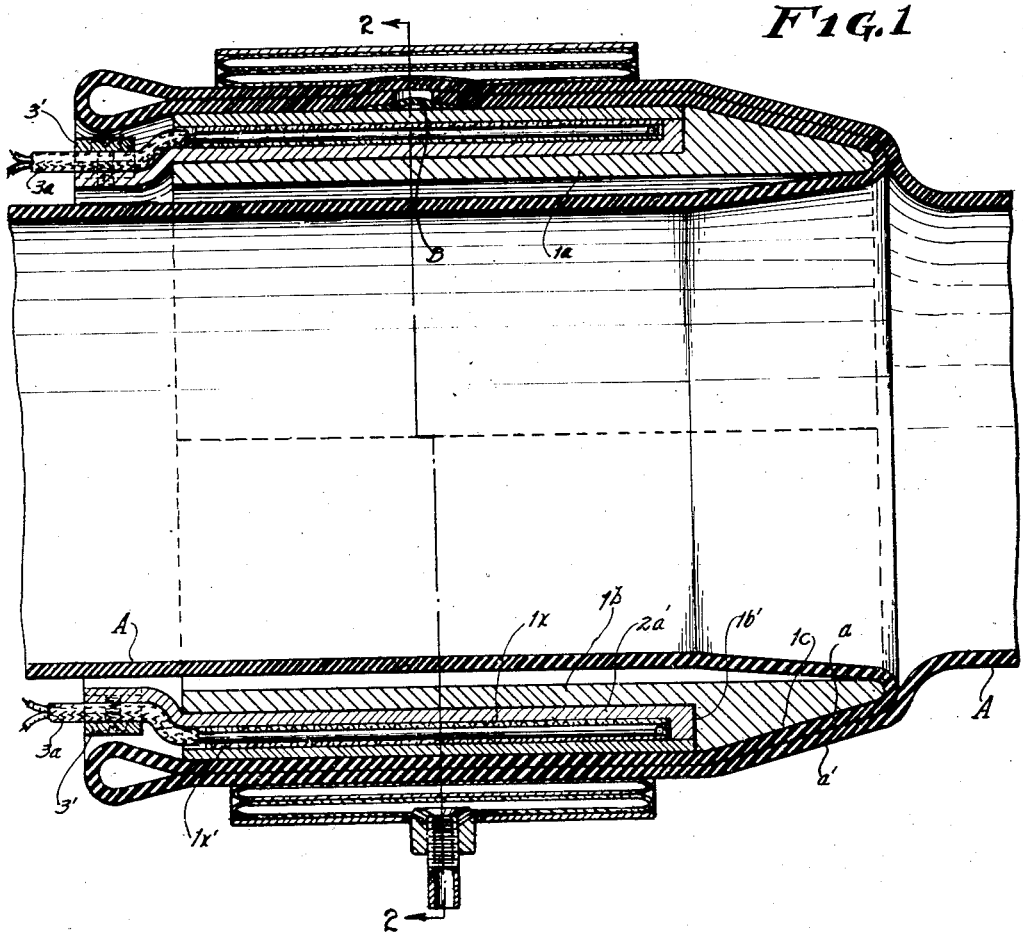
Figure 4:
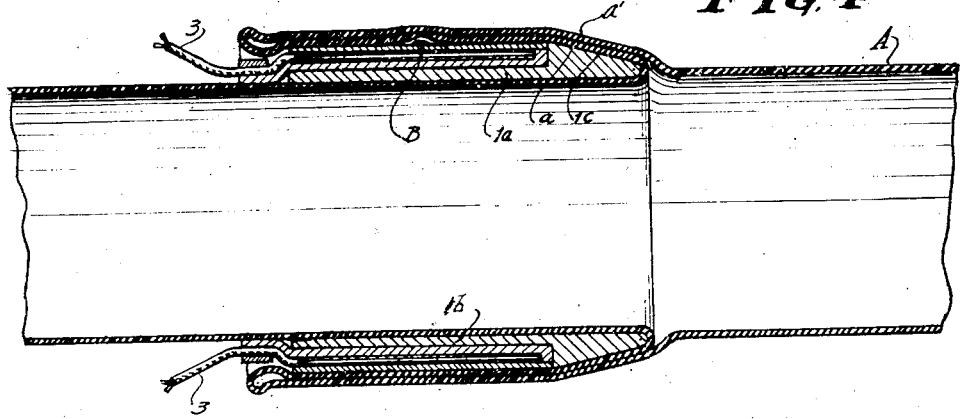
Fig. 4 is a longitudinal section showing the position of the mandrel and certain of the parts at one stage of the process in the assembly of the apparatus in operative relation to the inner tube.

In the drawings, 1 indicates as an entirety a mandrel preferably formed of heat resisting metal. The mandrel is formed in sections, preferably two sections 1a, 1b, to minimize the number of parts and thus facilitate assembly, as shown in Figs. 1, 2, 4 and 5 and disassembly operations thereof. Corresponding end portions of the mandrel sections 1a, 1b, are enlarged to provide a circumferential shoulder 1b' for a purpose later set forth and an outer tapering wall 1c terminating in a rounded end over which the walls of the tube A are positioned as later set forth. 2 indicates as an entirety a heating member (see Fig. 11) preferably comprising two semicircular sections 2x adapted to be related side-edge to side-edge with the tube therewithin. Each section 2x consists of an inner shell 2a, an outer shell 4 and a heating element 3 therebetween (see Figs. 6, 7 and 8). In the assembly of these parts a sheet of suitable insulating material 1x (such as mica) is interposed between the shell 2a and the heating element 3 and between the latter and the outer shell 4. The shells of each section are connected together (preferably tack welded) as shown at x. One side edge of each inner shell 2a is provided with spaced T-shaped lugs 2b, whereas its opposite side edge is formed with spaced recesses 2b', which are complementary to the horizontal sections of the T-lugs 2b. Accordingly, in this arrangement, when the sections 2x are assembled, the lugs 2b of one inner shell 2a fit the recesses 2b' of the other inner shell 2a. These complementary inter-related elements serve to guide the assembly of one section 2x on the other into side-by-side relation against relative movement endwise and hold the two sections together in locked relation. As shown, the vertical legs of the T-lugs on one side edge of each inner shell 2a are of a length to extend equal distances to either side of an imaginary diameter the radius of which corresponds to the radius of the adjacent shell, whereas its opposite side edge is cut away on lines coincident with inner side edges 2c of the recesses 2b', so that when the sections 2x are assembled, cutaway side openings 2c' are formed between the shells for a purpose later set forth. The opposite ends of the inner shells 2a are provided with flanges 2x', 2x'', and when assembled on the mandrel 1 the flanges 2x' abut the shoulder 1b' on the latter. Between the flanges 2x'' of each shell 2a, its wall is provided with an extension 2d (preferably disposed midway its side edges), which is curvilinearly embossed inwardly to accommodate the cable 3a for the current supply leads for the adjacent heating element 3. As will be observed, the flanges 2x', 2x'', on each inner shell 2a engage the opposite ends of the adjacent heating element 3 and mica sheets 1x. Each heating element 3 consists of a sheet of suitable insulating material 3b, such as mica, and a resistance 3b' wound or zigzag wrapped thereon. The mica sheet has a length substantially co-extensive with the surface area of the adjacent shell 2a, between its side edges and a width to fit between the flanges 2x', 2x'', thereof. The opposite end edges of the mica sheet 3b are formed with uniformly spaced notches, in which the loops of the resistance 3b' are reeved to maintain them out of contact and uniformly spaced. The cable 3a for the input and output leads, which are connected to each resistance 3b', engages one end of the mica sheets 1x preferably midway their side edges. The resistance extends in loop form through alternate notches 3x to the opposite side edges of the mica sheet as shown at 3c, 3c'; the loops then extend through the remaining notches from one side edge to the other side edge of the mica sheet 3b, as shown at 3x', thereby completing the circuit.

Figure 2:
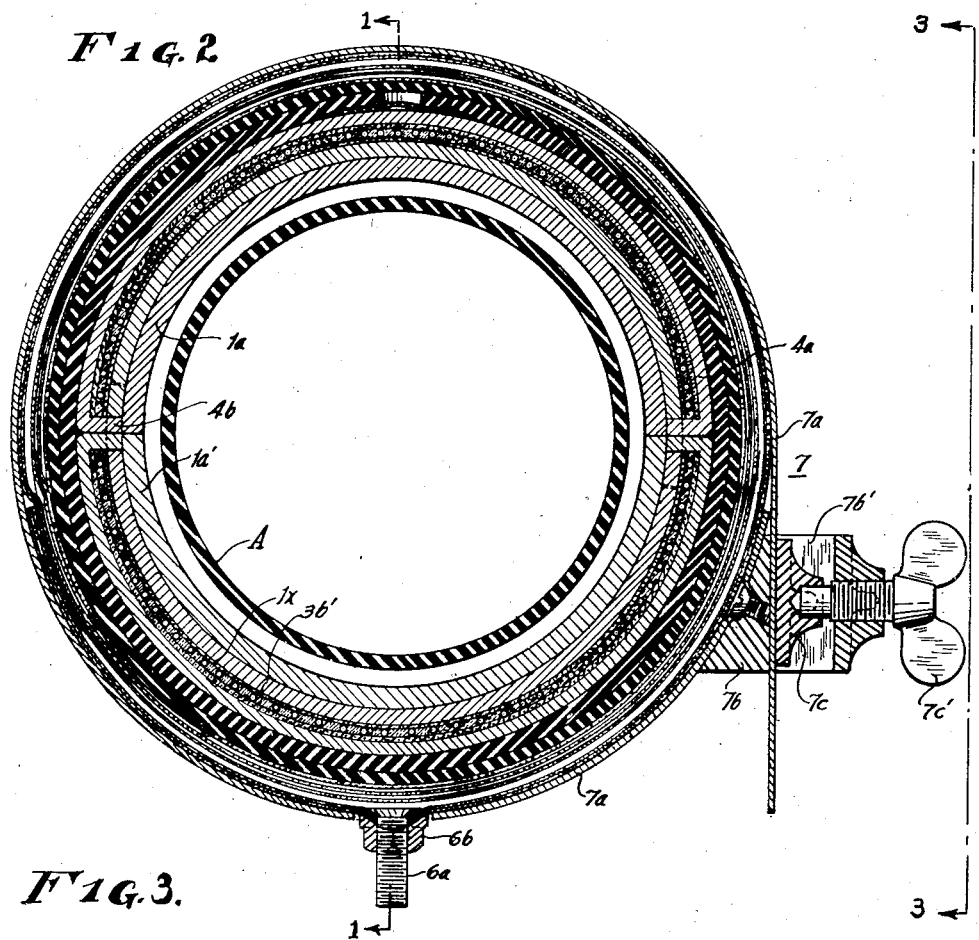
Fig. 2 is a section on the line 2—2 of Fig. 1.
Figure 3:
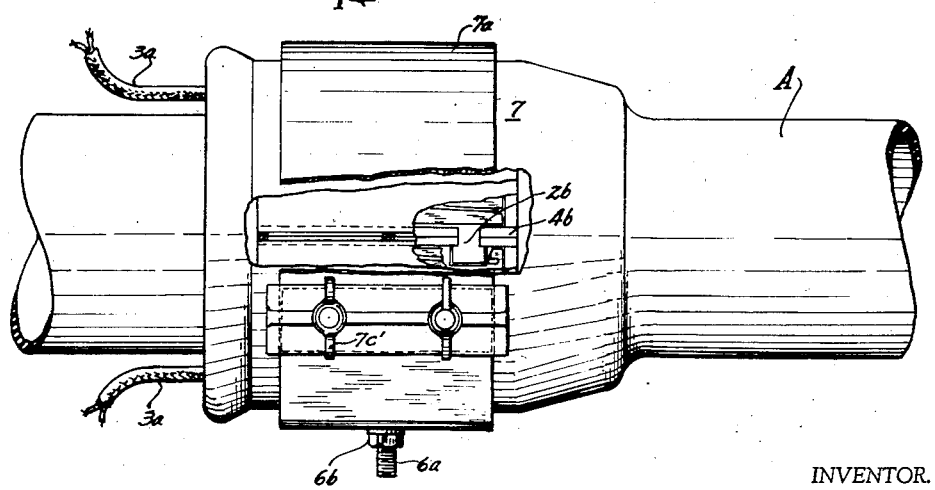
Fig. 3 is a side elevation of the apparatus as shown in Figs. 1 and 2, (looking in the direction indicated by the line 3—3 of Fig. 2), parts being broken away.
Figure 11:
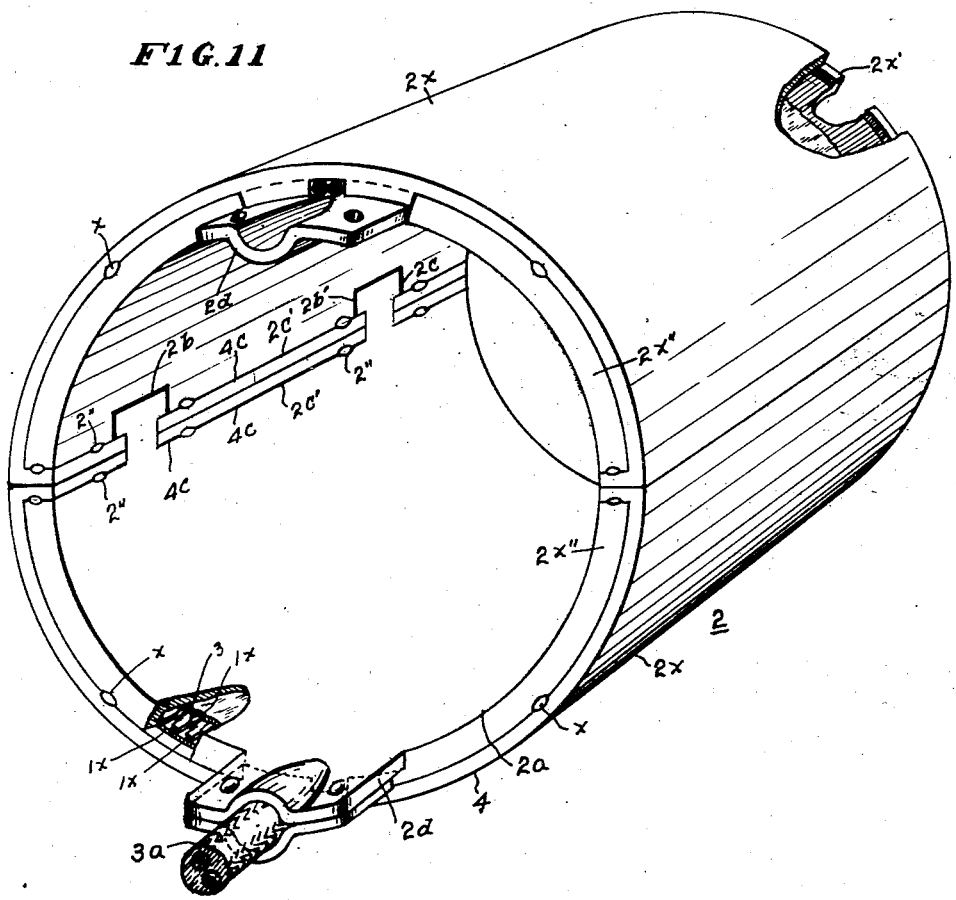
Fig. 11 is a perspective view of the sections forming the heating member showing their connected relation when assembled as shown in Figs. 1, 2, 3 and 4.
Figure 12:
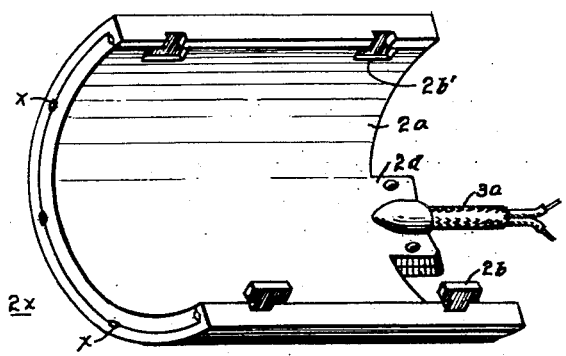
Fig. 12 is a perspective view of one section of the heating member.

The outer shells 4 of the sections 2x are formed of relatively high heat conducting metal. The inner ends of the shells 4, when the sections 2x are assembled, abut the shoulder 1b' of the mandrel 1 (see Fig. 1). The outer end of each outer shell 4 is provided with inwardly extending spaced lugs 4a which engage the adjacent extension 2d, whereas its opposite or inner end co-operates with the adjacent flange 2x'' at the inner end of the adjacent inner shell 2a to enclose the adjacent heating element 3. The lugs 4a on each outer shell are spaced to provide an opening for the adjacent cable 3a (see Fig. 1). 4b indicates bars on the inner wall of each outer shell 4, preferably formed integrally therewith and extending along the opposite side edges of the shell, these bars being arranged to engage corresponding bars on the side edges of the other outer shell when the sections 2x are assembled. As shown in Fig. 2 and 11, when the sections 2x are assembled, the bars 4b extend into the openings 2c' formed between the inner shells 2a. The bars 4b on each outer shell are formed with alined slots 4c through which the legs of the T-shaped lugs 2b of the inner shells 2a extend. As will be apparent, when the heating members 2x are assembled, the bars 4b co-operate with the T-lugs 2b to lock them and the sections of the mandrel 1 in assembled relation.

Each of the cables 3a is clamped to one of the extensions 2d by a plate 3', the opposite ends of which are secured to the adjacent extension in any desired manner, such as screws.

In carrying out my process the first step consists in assembling the sections 2x of the heating member 2 around the tire tube A and locking them together through the co-action of the T-lugs 2b, recesses 2b' and bars 4b; next, the two sections 1a, 1b, of the mandrel 1 are inserted within the heating member 2 around the tube A; next, the mandrel 1 and heating member 2 are positioned in spaced relation to the hole in the tube A (such spacing being approximately equal to half the length of the mandrel 1) and the patch B to be vulcanized is applied to the hole; next, the tube A is inflated until its diameter approximates the outside diameter of the heating member 2; next, the tube walls are folded back over the tapered end 1c of the mandrel and into surrounding relation to the heating member 2, as shown at a', a'' (see Fig. 4); next, the tube A is deflated to reduce its diameter to approximately its normal diameter.

The next step of the process consists in securing the folded portions a', a'', under pressure in fixed relation to the heating member 2. For this purpose I employ an air bag 6 and clamping means indicated as an entirety at 7. The air bag 6 consists of an elongated closed bag formed of suitable non-porous fabric but preferably non-porous paper capable of holding air at a pressure of 40 to 60 lbs. when inflated. The bag 6 has a width approximating the length of the heating member 2, and a length sufficient to be wrapped two or three times around the folded portions a', a'', of the tube A. Adjacent its outer end, the outer wall of the bag 6 is formed with an opening 6' in which a suitable air valve is mounted. The valve may be similar in construction to the valves used in inner tubes or an externally threaded tube 6a having a flange at its inner end engaging the inner surface of the outer wall of the bag, the external threads serving to take a nut 6b to clamp the bag wall between it and the flange and a threaded cap (not shown) to close the tube 6a. The opposite end portions of the bag 6 are sealed face-to-face to avoid any folding thereof, whereas the side portions of the material are sealed in overlapped relation centrally of the outer wall, as shown in Fig. 10, which overlapping portions are formed with registering openings and provide a double thickness of wall for the mounting of the valve 6a.

The tube A is then substantially deflated and then the bag 6 is wrapped tightly around the tube portions a', a'', and its outer free end secured to the adjacent convolution of the bag by strips 6a' of adhesive tape as shown in Fig. 9. The clamping means 7 is then applied. The clamping means 7 preferably consists of a flexible band formed of sheet metal 7a and clamping elements 7b, 7c. The band 7a has a length somewhat greater than the circumference of the bag 6 when wrapped around the tube portions a', a'', and a width substantially equal to that of the bag. The clamping element 7b consists of a fitting suitably fixed to the inner end of the band 7a and formed with a slot 7b' through which the outer end portion of the band is inserted. The clamping element 7c consists of a pressure plate mounted on the inner end of two thumb screws 7c' which are threadedly mounted in the outer wall of the slot 7b'. The band 7a is wrapped snugly but not tightly around the bag 6 and its outer end portion clamped to the inner end of the band by the elements 7b, 7c.

Next, the bag 6 is inflated with air to a pressure of 40 lbs. or more, the effect of which is to press the tube portions a', a'', tightly and uniformly inwardly against the heating member 2 throughout its circumference.

Finally, current is supplied to the resistances 3b' to heat the heating member 2 for vulcanizing the tube for a period of time dependent upon the thickness of the tube walls and curing speed of the material forming the patch B.

I prefer to use a paper bag as a means of providing the necessary pressure in carrying out the vulcanizing operation as it eliminates the use of a rubber tube and thereby avoids the utilization of rubber stock (either natural or synthetic) and paper bags being materially cheaper than rubber tubes, the cost of the equipment and up-keep thereof is reduced since the paper bags can be readily replaced. For example, even if each paper bag is used but once and discarded a new bag incurs but little expense. It will be observed that the lightness of the paper bag and its capability of being flattened (when deflated) and wrapped around the heating element 2 and its outer end secured as shown in Fig. 9 while the clamping means 7 are being applied, greatly facilitates the operation of positioning of the bag and the clamping means.

To those skilled in the art to which my invention relates many changes in construction and widely differing embodiments and applications of the invention will be apparent without departing from the spirit and scope thereof. My disclosures and the description herein are purely illustrative and not intended to be in any sense limiting.

What I claim is:

In apparatus of the class described, the combination of a mandrel formed of curvilinear sections adapted to be applied to the walls of a flexible tube, a pair of semi-circular, separable members in engagement with said mandrel, each of said members consisting of inner and outer semi-circular shells shaped to form a closed chamber therewithin, and means for connecting each end of one shell to the adjacent end of the other shell, separate means along the lateral sides of said members and within the outer surfaces of the outer shells for detachably connecting said members together, the outer surfaces of the outer shells forming a wall over which portions of the tube are folded, an electrical resistance mounted in said chamber of that member related to that portion of the tube to be treated, and having electrical terminals leading through one end wall of said member for connection to a source of electrical current supply, whereby the adjacent member may be heated, an elongated inflatable member formed of non-porous, non-resilient flexible material convolutely wrapped around the folded over portions of the tube, non-extensible means surrounding and removably binding said inflatable member while deflated in wrapped position, and a valve mounted in the outer end portion of said inflatable member adapted to be connected with a source of fluid supply under pressure, whereby said inflatable member may be inflated to effect inward radial pressure on the folded over portions of the tube against said heated member.

HOWARD I. MORRIS.

REFERENCES CITED

The following references are of record in the file of this patent:

UNITED STATES PATENTS

| Number | Name | Date |
| --- | --- | --- |
| 1,338,569 | Hostler | Apr. 27, 1920 |
| 1,364,362 | Fetter | Jan. 4, 1921 |
| 1,466,318 | Waters | Aug. 28, 1923 |
| 1,616,981 | Milligan | Feb. 8, 1927 |
| 1,655,095 | Fetter | Jan. 3, 1928 |
| 1,707,794 | Blaker | Apr. 2, 1929 |